United States Patent [19]
Ishii et al.

[11] Patent Number: 5,602,822
[45] Date of Patent: *Feb. 11, 1997

[54] OPTICAL HEAD AND LENS ACTUATOR

[75] Inventors: Masaru Ishii, Kamakura; Akihiro Kasahara, Kawasaki, both of Japan

[73] Assignee: Kabushiki Kaisha Toshiba, Japan

[*] Notice: The term of this patent shall not extend beyond the expiration date of Pat. No. 5,483,516.

[21] Appl. No.: 522,120

[22] Filed: Aug. 31, 1995

Related U.S. Application Data

[63] Continuation of Ser. No. 326,747, Oct. 20, 1994, Pat. No. 5,483,516, which is a continuation of Ser. No. 35,247, Mar. 22, 1993, abandoned.

[30] Foreign Application Priority Data

Apr. 20, 1992 [JP] Japan ................................ 4-099809

[51] Int. Cl.⁶ ................................................ G11B 17/00
[52] U.S. Cl. ................................................ 369/247
[58] Field of Search ........................... 369/247, 292, 369/244, 249, 215, 219, 44.15–44.16; 250/201.5; 359/811, 813, 814, 822, 823, 824

[56] References Cited

U.S. PATENT DOCUMENTS

| | | | |
|---|---|---|---|
| 4,922,477 | 5/1990 | Miura | 369/244 |
| 4,942,562 | 7/1990 | Suzuki | 369/249 |
| 5,144,617 | 9/1992 | Gotoh et al. | 369/244 |
| 5,164,936 | 11/1992 | Kagami | 369/247 |
| 5,182,738 | 1/1993 | Yoshikawa | 369/247 |
| 5,187,702 | 2/1993 | Takahashi | 369/215 |
| 5,258,971 | 11/1993 | Yamamoto et al. | 369/244 |
| 5,483,516 | 1/1996 | Ishii et al. | 369/247 |

FOREIGN PATENT DOCUMENTS

| | | | |
|---|---|---|---|
| 58-158047 | 9/1983 | Japan | 369/247 |
| 58-205933 | 12/1983 | Japan | 369/247 |
| 60-236127 | 11/1985 | Japan | 369/44.15 |
| 1144240 | 6/1989 | Japan | 369/44.14 |
| 3-084740 | 4/1991 | Japan | 369/44.16 |

*Primary Examiner*—Stuart S. Levy
*Assistant Examiner*—Allen Cao
*Attorney, Agent, or Firm*— Cushman Darby & Cushman IP Group of Pillsbury Madison & Sutro, LLP

[57] ABSTRACT

A movable-side support member having a lens holding portion is connected to a stationary-side support member by two parallel elastic support plates. The objective lens held by the lens holding portion can be moved away from the data-recording surface of an optical disk as the elastic support plates are elastically deformed. The stationary-side support member is fastened to a carriage and can be moved in the radial direction of the optical disk as the carriage moves in that direction. The elastic support plates are inserted in the movable-side support member and the stationary-side support member, respectively, and are integral therewith—not overlapping each other.

1 Claim, 5 Drawing Sheets

OPTICAL HEAD AND LENS ACTUATOR

This is a continuation of U.S. application Ser. No. 08/326,747, filed Oct. 20, 1994, now U.S. Pat. No. 5,483,516, which was a Continuation of Ser. No. 08/035,247 filed Mar. 22, 1993, now abandoned.

BACKGROUND OF THE INVENTION

1. Field of the Invention

The present invention relates to an optical head of an optical disk apparatus, which processes information by applying a light beam to an optical disk for use as an information storage medium, and a lens actuator used in the optical head.

2. Description of the Related Art

An optical head of an optical disk apparatus comprises an objective lens which focuses a parallel laser beam, emitted from a semiconductor laser and guided through an optical system, including a collimator lens, a riser mirror, etc., onto an optical disk, and converts a reflected laser beam from the optical disk into a parallel beam again.

The objective lens is supported by means of a lens actuator having a lens holder, for movement in a direction (focus control direction) such that the lens moves toward and away from an information recording surface of the optical disk. Thus, the objective lens can be focused following fluctuations of the disk and the like.

Conventionally, the lens actuator of this type comprises a movable-side support member integral with the lens holder, a stationary-side support member located at a distance from the movable-side support member, and two parallel leaf springs, upper and lower, connecting these support members. The stationary-side support member is fixed to a carriage which is movable along the surface of the optical disk.

Meanwhile, optical heads of optical disk apparatuses are being reduced in size every year, and lens actuators for use therewith are also being miniaturized. The movable- and stationary-side support members and the upper and lower parallel leaf springs are formed by integral molding.

The lens actuators are molded in the following manner. After the two parallel leaf springs are positioned in a cavity of a mold, a resin is poured into the cavity. Then, the movable-side support member, with the lens holder thereon, and the stationary-side support member are molded. At the same time, fitting portions at the respective opposite ends of the leaf springs are embedded (or inserted) in the movable- and stationary-side support members, thereby forming an integral structure.

In the conventional lens actuators integrally molded in this manner, the two leaf springs of the same width are inserted in a manner such that they extend parallel to each other and overlap each other with respect to the planar direction.

Thus, in the conventional lens actuators, the insert-molded parallel leaf springs of the same width, upper and lower, overlap each other with respect to the planar direction (direction of the optical axis of the objective lens), so that molding the lens actuators requires use of complicated molds.

The mold comprises two basic components, i.e., an upper mold half and a lower mold half. The mold halves forms a cavity when they pare put together. In this cavity, the movable- and stationary-side support members will be molded. Demand has been made for a slide mold which is designed for use, along with the upper and lower mold halves, for molding parallel leaf springs, and which can be moved, after use, in a direction perpendicular to the direction in which the leaf springs overlap one another.

Thus, the molds used to form the lens actuators are complicated in construction and very expensive, so that the manufacturing cost of the lens actuators is high. Gaps is provided between each slide mold and the two leaf springs sandwiching the slide mode, to allow the slide molds to move without scratching the leaf springs. Due to these gaps, the leaf springs can move freely, inevitably decreasing the parallelism between them. That is, the leaf springs tilt in the clearance while the lens actuator are being formed. Consequently, crosstalks in the focusing and tracking directions are liable to be caused.

In addition to entailing the high manufacturing cost, as described above, the conventional lens actuators are subject to a drawback such that the mobility of the objective lens is not steady enough. Also, the optical heads which use these lens actuators have similar problems.

SUMMARY OF THE INVENTION

The present invention has been contrived in order to solve these problems of the prior art, and therefore, its object is to provide an optical head and a lens actuator, capable of reduction in price, stabilization of the mobility of an objective lens, etc.

According to the present invention, there is provided an optical head which comprises: an objective lens for converging a light beam on an optical disk; a lens actuator having a lens holding portion for holding the objective lens, the lens holding portion being supported for movement in the direction of the optical axis of the objective lens; a carriage means for carrying the lens actuator thereon, said carriage means being movable along the surface of the optical disk; and lens drive means for moving the lens holding portion, movably supported by means of the lens actuator, in the direction of the optical axis of the objective lens, the lens actuator including a movable-side support member having the lens holding portion, a stationary-side support member fixed to a mounting portion on the carriage means at a distance from the movable-side support member, and first and second elastic support plates formed integrally with the movable- and stationary-side support members so as to connect the same and arranged parallel to each other in an offset manner lest the support plates overlap each other in the direction of the optical axis of the objective lens.

According to the optical head of the present invention, the two parallel elastic support plates, which are formed integrally with the stationary-side support member and the movable-side support member integral with the lens holding portion so as to connect the same, are arranged in an offset manner lest they overlap each other in the direction of the optical axis of the objective lens, so that the integral molding requires use of no slide mold which can slide in a direction perpendicular to the optical axis of the objective. Thus, the mold, enjoying a simple construction, is low-priced, so that the manufacturing cost of the lens actuator can be lowered. Further, the parallelism between the two elastic support plates can be improved to stabilize the mobility of the objective lens, since the mold does not have a clearance which a slide mold has, and the elastic support plates are held steadily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will now be described in detail with reference to the accompanying drawings.

Figure 1:
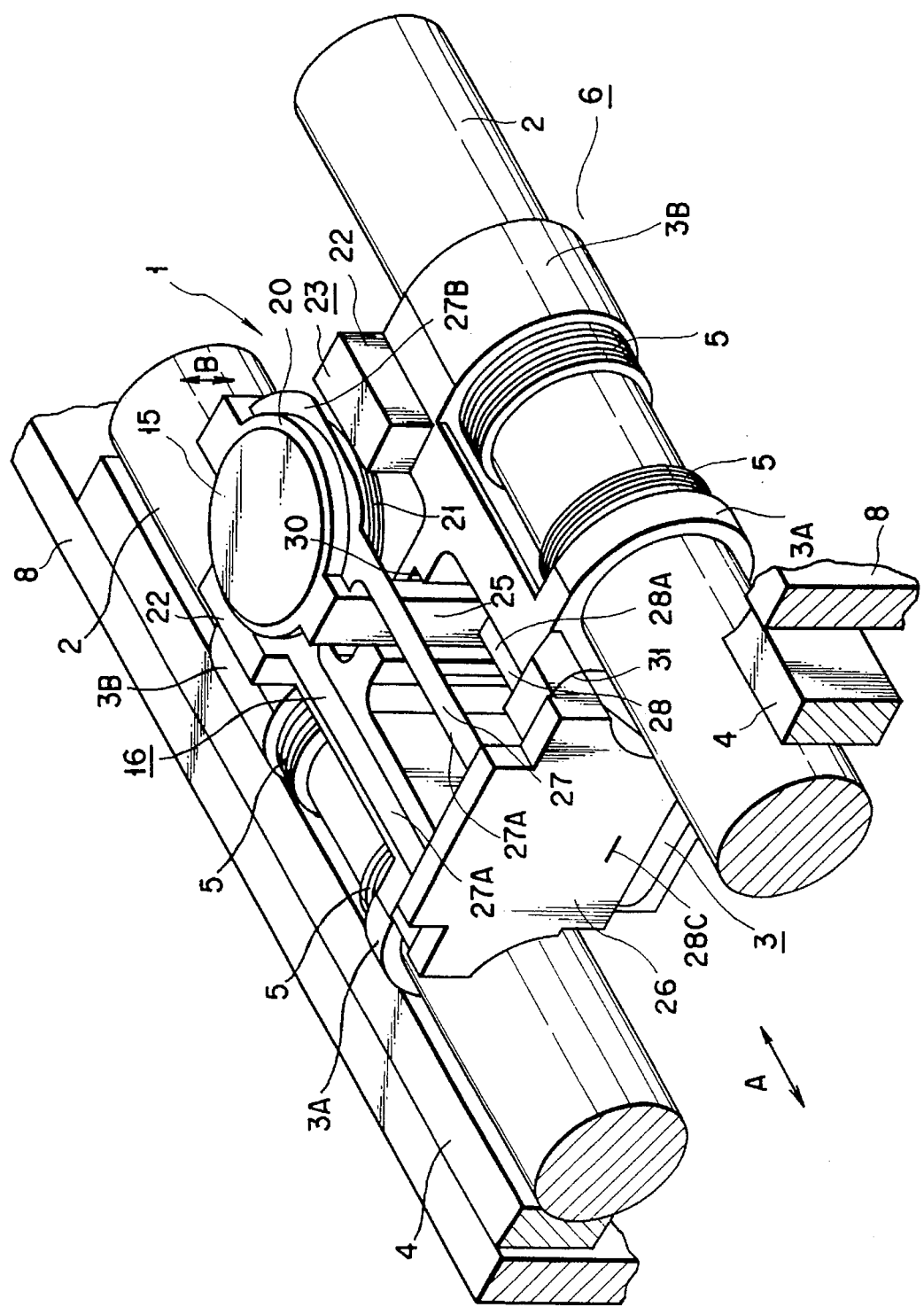
FIG. 1 is a perspective view schematically showing the construction of an optical head according to an embodiment of the present invention.
Figure 2:
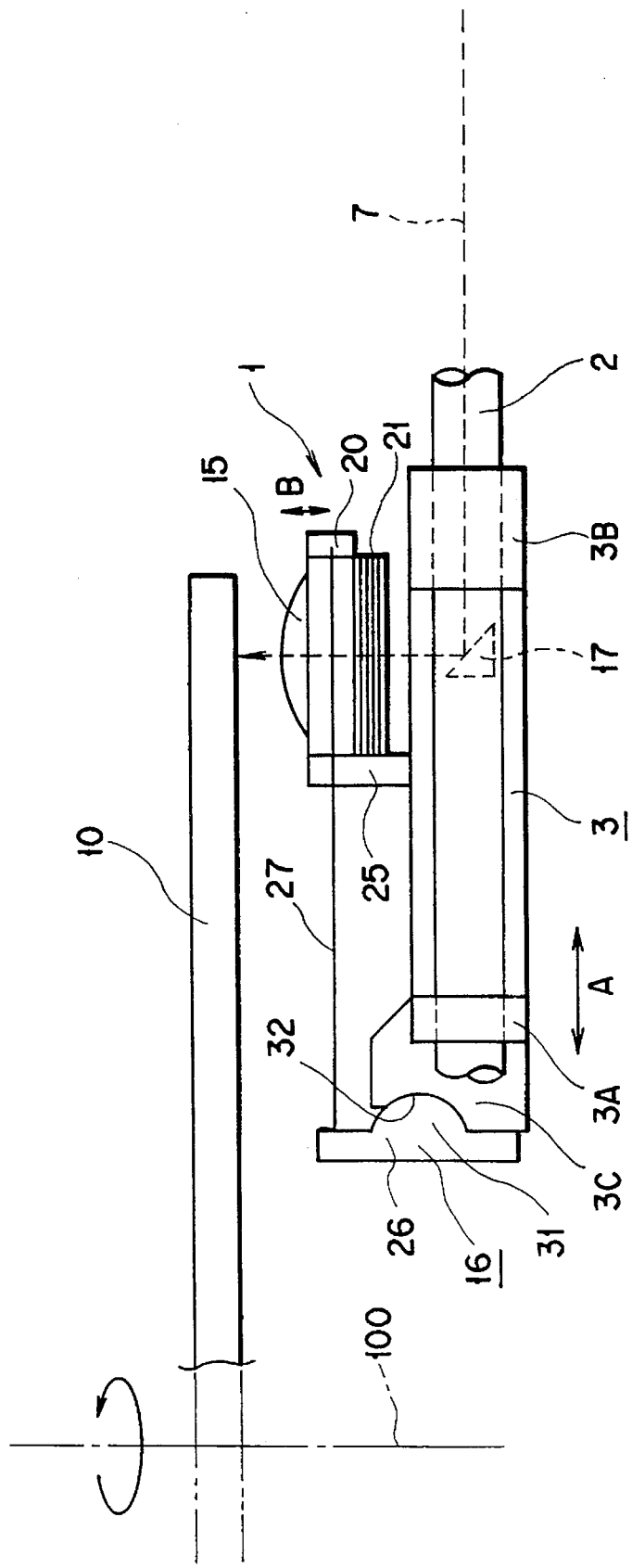
FIG. 2 is a schematic view showing the location of the optical head shown in FIG. 1 compared with an optical disk.

Referring first to FIGS. 1 and 2, the construction of an optical head will be described.

The optical head 1 comprises a carriage 3 which can reciprocate in the direction of arrow A along two guide shafts 2.

The carriage 3 is moved, by means of a linear motor 6, in the direction of arrow A, that is, in the radial direction (track control direction) of an optical disk 10 (see FIG. 2) for use as an information storage medium. The linear motor 6 comprises yokes which double as the guide shafts 2, magnets 4 extending parallel to the shafts (yokes) 2, coils 5 directly fitted individually on bearing portions 3A and 3B of the carriage 3, and a back yoke 8.

The carriage 3 carries thereon a lens actuator 16, which holds an objective lens 15, and a riser mirror 17 (see FIG. 2). A laser beam 7, which is emitted from a semiconductor laser (not shown) and guided through an optical system (not shown), including a collimator lens, beam splitter, galvanomirror, etc., is applied to an information recording surface of the optical disk 10 by means of the lens 15 and the mirror 17. Also, the lens 15 and the mirror 17 serve to guide the laser beam 7, reflected by the optical disk 10, to detectors (not shown) for focusing, tracking and reproducing signals, through the optical system.

A focus control coil 21 is intimately fixed to a lens holding portion 20 for holding the objective lens 15 of the lens actuator 16. Arranged on the carriage 3, which carries the actuator 16 thereon, are magnets 22 for providing the focus control coil 21 with magnetic fields in desired directions. These magnets 22 constitute lens drive means 23 for moving the lens holding section 20 for the objective lens 15 in the direction of arrow B, that is, in the direction (focus control direction) toward or away from the optical disk 10.

The optical disk 10 is driven around a rotation center 100 (see FIG. 2) by means of a disk drive unit (not shown).

Figure 3:
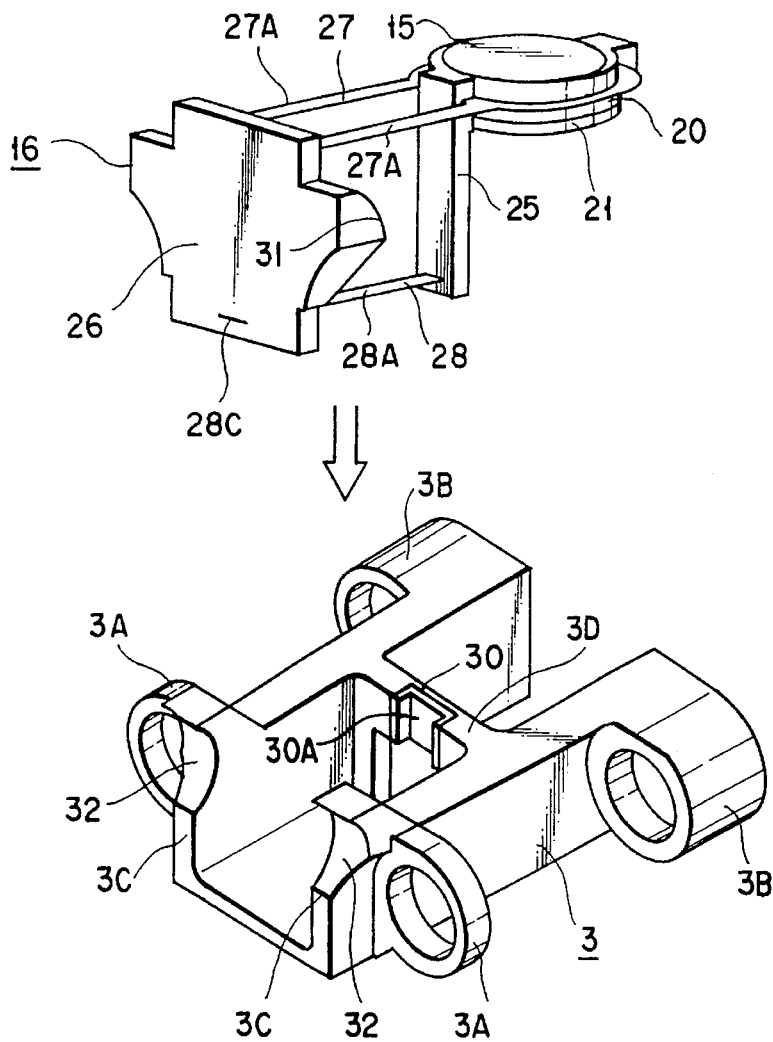
FIG. 3 is an perspective view showing the principal part of the optical head of FIG. 1.

As is also shown in FIG. 3, the lens actuator 16 comprises a plastic movable-side support member 25 including the lens holding portion 20, a plastic stationary-side support member 26 fixed to a pair of mounting portions 3C of the carriage 3 so that a space is secured between the support members 25 and 26, and first and second elastic support plates 27 and 28 formed of a leaf spring each. The plates 27 and 28, which are formed integrally with the movable- and stationary-side support members 25 and 26 so as to connect them, are arranged parallel to each other in an offset manner lest they overlap each other with respect to the planar direction.

The first elastic support plate 27, which is situated on the upper side, has a configuration such that two arm portions 27A extend between the stationary-side support member 26 and the lens holding portion 20. The second elastic support plate 28, which is situated on the lower side, has a configuration such that an arm portion 28A extends between the movable- and stationary-side support members 25 and 26 and vertically corresponding to the position half way between the two arm portions 27A.

The movable-side support member 25, which has the lens holding portion 20 at the top, is in the form of a belt elongated in the vertical direction, and is fitted for vertical movement in a groove 30 which is vertically formed in a rising wall 3D of the carriage 3. The groove 30 serves to restrain an undesired motion in the rolling direction. The gap between the groove 30 and the movable-side support member 25 may be filled with gel-like material 30A, thereby to dampen the force applied to the member 25 in the rolling direction.

The stationary-side support member 26, which is molded in the form of a plate, has arcuate positioning projections 31 individually on the opposite side end portions of its front face. The support member 26 is positioned with respect to the carriage 3 by engaging the projections 31 individually with arcuate positioning grooves 32 of the mounting portions 3C of the carriage 3. Positioned in this manner, the support member 26 is bonded to the carriage 3 to be one therewith by means of a bonding agent.

Referring now to FIGS. 4 to 9, the lens actuator 16 will be described further in detail.

Figure 4:
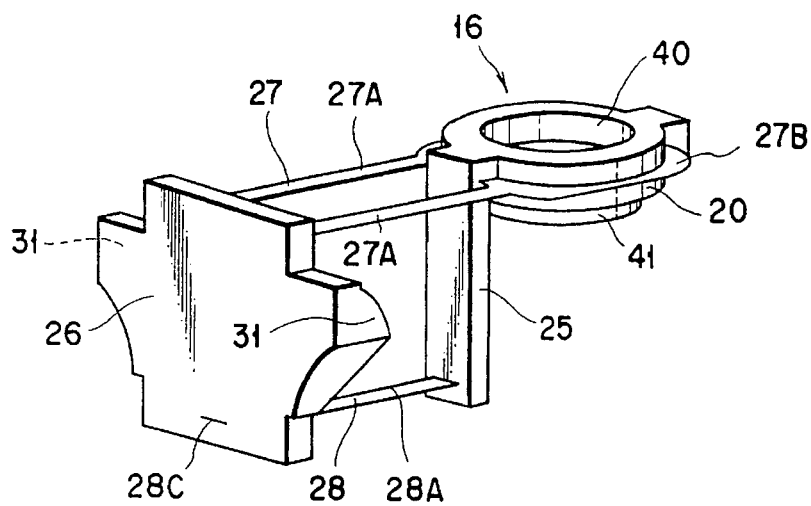
FIG. 4 is a perspective view showing an embodiment of a lens actuator according to the invention.

FIG. 4 shows the lens actuator 16 as a simple structure, which is fabricated in the following manner.

Figure 5:
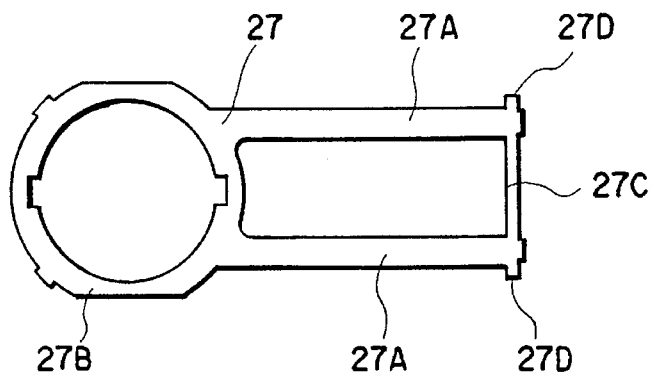
FIG. 5 is a plan view of a first elastic support plate for use as a component of the lens actuator shown in FIG. 4.
Figure 6:
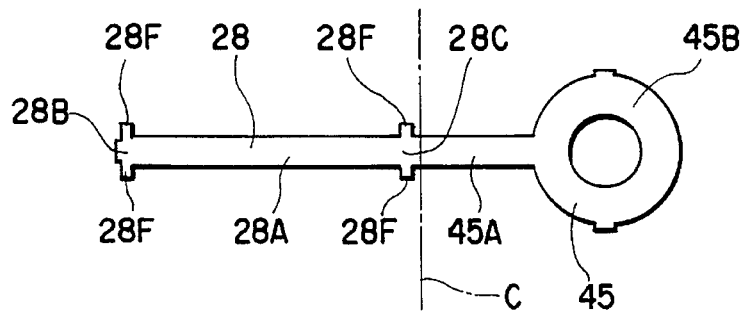
FIG. 6 is a plan view of a second elastic support plate for use as another component of the lens actuator of FIG. 4, in a state such that the support plate has a positioning member.
Figure 7:
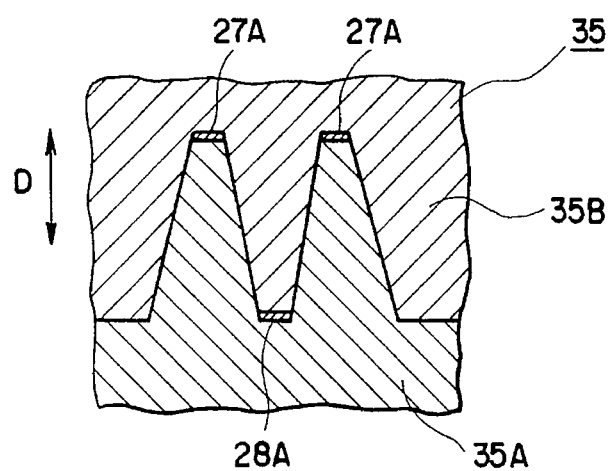
FIG. 7 is a partial view of a mold used in molding the lens actuator of FIG. 4.

After the first and second elastic support plates 27 and 28 shown in FIGS. 5 and 6, respectively, are positioned in a cavity (not shown) of a mold 35 shown in FIG. 7, a resin is poured into the cavity. Then, the movable-side support member 25, which has the lens holding portion 20, and the stationary-side support member 26 are molded. At the same time, first and second fitting portions 27B and 27C of the first elastic support plate 27, on the upper side, and first and second fitting portions 28B and 28C of the second elastic support plate 28, on the lower side, are embedded (or inserted) in the movable- and stationary-side support members 25 and 26, thereby forming an integral structure.

At this time, the lens holding portion 20 is formed simultaneously with a laser beam aperture 40, which has a supporting step portion for supporting the objective lens 15, and a coil mounting portion 41 to be fitted with the focus control coil 21.

A pair of retaining projections 27D are formed on the second fitting portion 27C of the first elastic support plate 27, whereby the embedded portions can enjoy a satisfactory coupling strength. Also, a pair of retaining projections 28F are formed on each of the first and second fitting portions 28B and 28C of the second elastic support plate 28, whereby the embedded portions can enjoy a satisfactory coupling strength.

The arm portions 27A of the first elastic support plate 27, on the upper side, and the arm portion 28A of the second elastic support plate 28, on the lower side, are arranged in an offset manner lest they overlap each other with respect to the planar direction. Accordingly, the mold 35 for integral molding can be designed so that it is allowed to be removed only in the direction of arrow D in FIG. 7. Thus, a structure which requires use of no slide mold can be molded by means of a simple, low-priced mold.

When the first and second elastic support plates 27 and 28 are located in the cavity (not shown), moreover, the arm portions 27A and 28A can be securely held between stationary and movable molds 35A and 35B, as shown in FIG. 7. Therefore, the parallelism between the support plates 27 and 28 can be obtained more easily, so that high-accuracy molding can be effected. Thus, the resulting lens actuator can be a high-performance actuator which is not liable to strokes in the focusing and tracking directions.

The second elastic support plate 28 on the lower side has a simple configuration such that the fitting portions 28B and 28C are formed by providing the retaining projections 28F on each end of the belt-shaped arm portion 28A. Possibly, therefore, the support plate 28 cannot be stably positioned with respect to the mold 35. To cope with this, the second elastic support plate 28 is provided with a positioning member 45, which is adapted to be cut along a cutting line C and removed after the molding operation. The positioning member 45 is composed of a belt-shaped connecting portion 45A, which is continuous with the fitting portion 28C, and a ring-shaped positioning portion 45B, which is formed on the extreme end of the connecting portion 45A and adapted to engage a positioning projection (not shown) of the mold 35.

Figure 8:
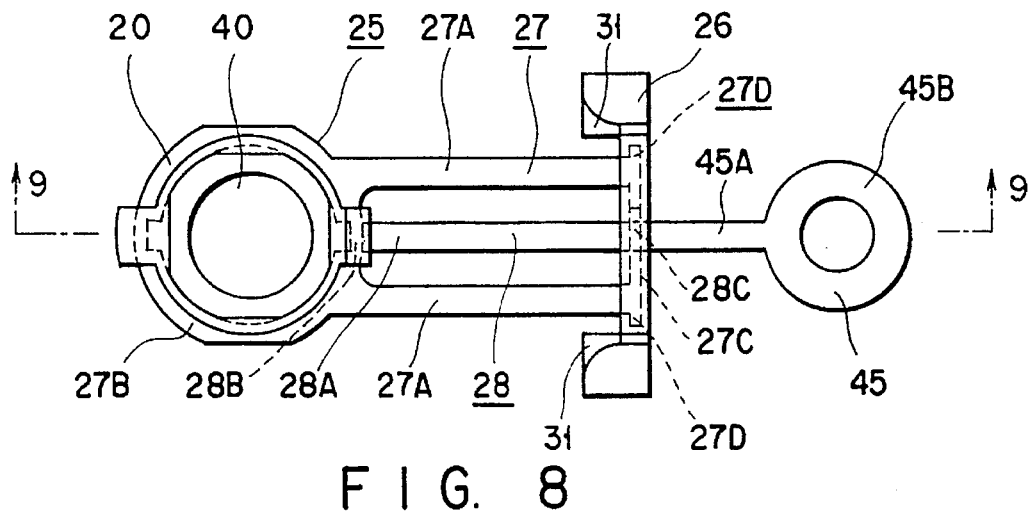
FIG. 8 is a plan view showing a state immediately after the lens actuator of FIG. 4 is molded.
Figure 9:
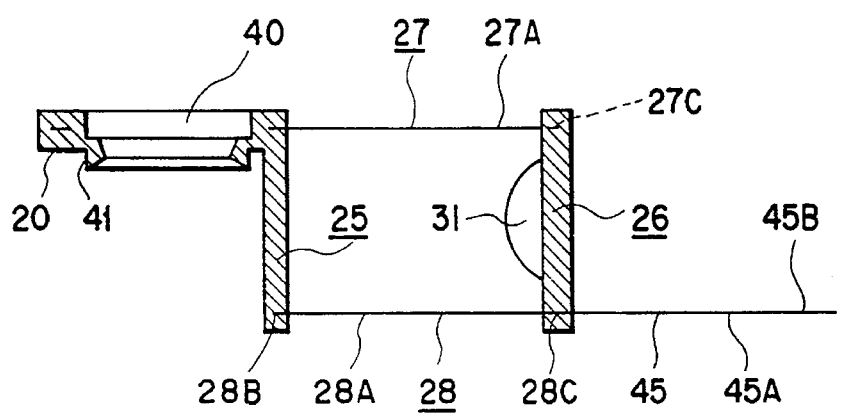
FIG. 9 is a sectional view taken along line 9—9 of FIG. 8.

FIGS. 8 and 9 show a state immediately-after the molding operation. As seen from these drawings, the lens actuator 16 in this state is accompanied with the positioning member 45 which is already unnecessary. The lens actuator 16 as a finished product shown in FIG. 4 can be obtained by removing the positioning member 45 in this state.

Figure 10:
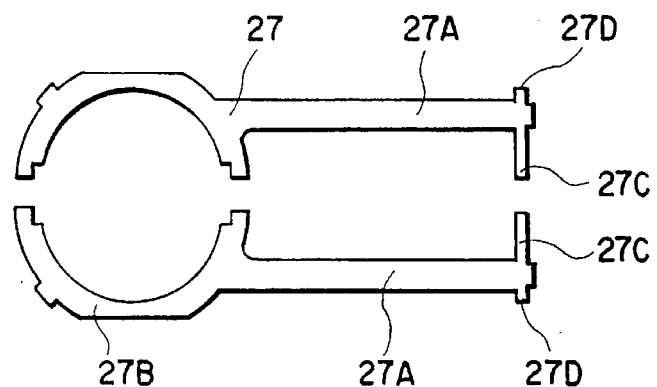
FIG. 10 is a plan view showing a modification of the first elastic support plate.

In the embodiment described above, the first elastic support plate 27 on the upper side is a one-piece structure. Alternatively, however, it may be a two-piece structure in which the two arm portions 27A are separated right and left, as shown in FIG. 10.

The number of the arm portions is not limited to the case of the foregoing embodiment, and it is necessary only that the upper and lower arm portions be able to be arranged without overlapping each other with respect to the planar direction.

It is to be understood that the present invention is not limited to the embodiments described above, and that various changes and modifications may be effected therein by one skilled in the art without departing from the scope or spirit of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head comprising:

an objective lens for converging a light beam on an optical disk;

a movable-side support member, molded out of resin, for holding the objective lens;

carriage means for carrying the objective lens held by the movable-side support member, said carriage means being movable along a surface of the optical disk;

a stationary-side support member molded out of resin and fixed to the carriage means, with a certain distance maintained with reference to the movable-side support member;

first support means for movably supporting the movable-side support member in a direction of an optical axis of the objective lens, said first support means comprising first and second elastic members each of which has two ends, one of the two ends being embedded in the stationary-side support member, and the other end being embedded in the movable-side support member, such that the first and second elastic members are located in parallel to each other along a direction perpendicular to the optical axis of the objective lens in a first plane perpendicular to the optical axis of the objective lens; and second support means, comprising a third elastic member having two ends, for supporting the movable-side support member in cooperation with the first and second elastic members of the first support means and the third elastic member of the second support means such that the movable-side support member is movable relative to the carriage means in the direction of the optical axis of the objective lens, one of the two ends of the third elastic member being embedded in the stationary-side support member, and the other end of the two ends of the third elastic member being embedded in the movable-side support member, such that the third elastic member is located in a second plane different from the first plane and perpendicular to the optical axis of the objective lens, and between the first and second elastic members of the first means in the direction of the optical axis of the objective lens, is maintained parallel to the first and second elastic members of the first support means along the direction perpendicular to the optical axis of the objective lens, and is prevented from overlapping with each other in the optical axis direction of the objective lens.

* * * * *